Feb. 4, 1969

S. D. BURTON 3,425,719

TUBE COUPLING

Filed April 24, 1967

INVENTOR
SAMUEL D. BURTON

BY
Oberlin, Maky, Donnelly & Renner
ATTORNEYS 3,425,719
                   TUBE COUPLING
Samuel D. Burton, Pacific Palisades, Calif., assignor to
  Parker-Hannifin Corporation, Cleveland, Ohio, a corporation of Ohio
        Filed Apr. 24, 1967, Ser. No. 633,281
U.S. Cl. 285—382.2                              5 Claims
Int. Cl. F16l *13/14*

ABSTRACT OF THE DISCLOSURE

Tube coupling formed by contracting a tube beyond its yield stress to cause contraction of a coupling member disposed in an end thereof. Coupling member has a higher yield stress than tube, whereby when contacting force is released, the higher hoop compressive stress in coupling member is counterbalanced by hoop tensile stress in tube. Shear forces between tube and coupling member are distributed over a plurality of ribs on coupling member.

Disclosure

This invention relates generally as indicated to a tube coupling and more particularly to a tube coupling which is formed by diametrically contacting a tube into locking and sealing contact with a coupling member inserted into the end of the tube.

A principal object of this invention is to provide a unique light weight coupling member which forms a very effective mechanical connection and fluid-tight seal with the tube to which it is connected.

Another object is to provide a tube coupling in which the axial pull-out loads acting thereon are distributed over a plurality of gripping ribs.

These and other objects are achieved by providing a coupling member of a harder material (higher yield strength) than the tube into which it is inserted, with a plurality of longitudinally spaced external gripping ribs on the outer surface of the coupling member, whereby when the tube is diametrically contacted beyond its elastic limit to cause contraction of the coupling member and then allowed to expand, a hoop tensile stress is created in the tube by the expansion of the coupling member of a magnitude sufficient to counterbalance the remaining hoop compressive stress in the coupling member. These stresses are concentrated at the contact areas between the ribs on the coupling member and the tube to create an effective seal. Moreover, the ribs penetrate the tube during such radial contraction to establish both a shearing connection and a frictional connection between the tube and coupling member.

The coupling member is preferably of a progressively thinning cross-section toward the outer end in accordance with the decreasing load thereon to reduce its weight to a minimum, and the ribs are progressively longer in the same direction, whereby they will bend progressively greater amounts from the outer end in to distribute axially applied loads over a plurality of the ribs.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

Figure 1:
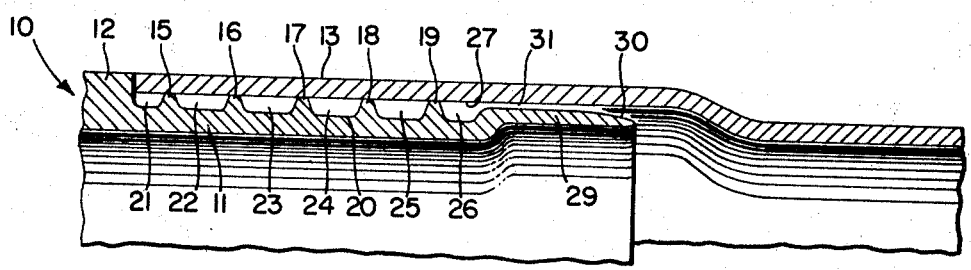
Figure 2:
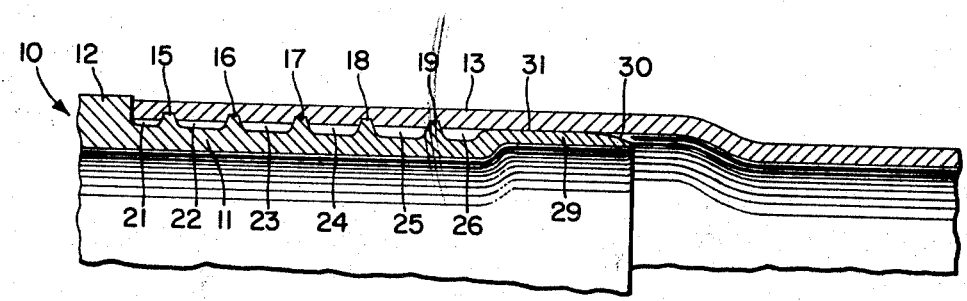

In such annexed drawing:

FIG. 1 is a fragmentary longitudinal cross section through a preferred form of coupling member in accordance with this invention showing a tube telescoped thereover before contraction of the tube into locking engagement with the coupling member; and FIG. 2 is an enlarged fragmentary cross-section view similar to FIG. 1, but showing the tube and coupling member coupled together.

In the illustrated embodiment of the invention, there is shown a coupling member 10 in the form of a sleeve 11 having a uniform I.D. and an external flange 12 at one end which serves as a stop for the expanded end of a tube 13 telescoped over the sleeve. Two such sleeves 11 separated by a flange 12 may be provided for joining two tubes together in a manner to be explained hereafter.

There are a plurality of external annular ribs 15, 16, 17, 18, 19 on the outer wall 20 of the sleeve 11, formed by annular recesses 21, 22, 23, 24, 25, 26 in such outer wall. The outer diameters of the ribs 15–19 are substantially the same to provide a close fit in the tube bore 27, but the depths of the recesses progressively increase toward the entry end of the sleeve 11 to provide progressively longer ribs; that is, recess 22 is deeper than recess 21 to provide a rib 16 longer than rib 15; recess 23 is deeper than recess 22 to provide a rib 17 longer than rib 16; recess 24 is deeper than recess 23 to provide a rib 18 longer than rib 17, and so on. All of the ribs 15–19 are shown as having a uniform width at their O.D. but the intermediate ribs 16–18 may be wider at their O.D. than the end ribs 15, 19. In any event, all of the ribs are relatively narrow as compared to the widths of the recesses 22–26, and the sides of the ribs may have a taper of approximately 20° from the vertical.

At the entry end of the sleeve 11 there is a thin extension 29. The O.D. of the extension 29 may be the same as the O.D. of the ribs 15–19 or somewhat less as shown and the outer end of such extension is rounded at 30 to merge tangentially with the outer surface 31 which facilitates assembly of the tube over the sleeve.

The sleeve 11 is of a harder material than the tube 13, and has a higher yield strength. Thus, for example, the sleeve 11 may be of "Inconel" 718 and the tube 13 of 7030 Cu Ni alloy having a hardness of Rockwell B 36–45. Accordingly, when the tube 13 is telescoped over the sleeve 11 as in FIG. 1 and contracted into contact with the sleeve 11 as by means of a radially split die or other suitable deforming tool, the ribs 15–19 become partially embedded in the inner surface of the tube (see FIG. 2). The tube 13 is contracted sufficiently beyond its elastic limit to cause contraction of that portion of the sleeve 11 encircled by the tube 13 to a point near or preferably beyond its yield stress, after which the contracting force is released to permit expansion of the sleeve 11 and tube 13 to the FIG. 2 condition due to the hoop compressive stress stored therein during contraction. The sleeve 11, being of a harder material than the tube 13, will tend to expand a greater amount than the tube 13, whereby the tube 13 is subjected to a hoop tensile stress sufficient to counterbalance the remaining hoop compressive stress in the sleeve 11. This stress is transmitted to the tube 13 by the ribs 15–19 and since the ribs are narrow and only partially embedded in the tube, the unit contact pressure of the ribs against the tube is quite high, high enough to make a tight seal against fluid pressures of 4500 p.s.i. and over.

In addition to the tight seal contact between the ribs 15–19 and tube 13, there is substantial friction contact therebetween as well as bearing contact created by penetration of the ribs into the tube for resisting axial pull-out forces on the tube.

In the usual tube coupling, substantially all of the shear forces which are developed between a coupling member and tube to resist axial pull-out forces on the tube pass through the ribs 15 and 19 at opposite ends of the coupling member with very little shear forces being transferred by the intermediate ribs, whereby high stress concentrations are created which could cause early failure of the coupling. However, because the rib 19 is relatively long and narrow, such axial forces will cause deflection of the rib 19 and slight axial stretching of the soft tube 13 in the region between the ribs 18 and 19 so that part of the forces which would otherwise be carried by the rib 19 is transferred to the rib 18.

The rib 17, being the mid-gripping point of the sleeve 11, is usually subjected to the least axial pull. However, the rib 18 which is only slightly shorter than the rib 19, will deflect under the axial forces acting on it to permit axial stretching of the tube 13 in the region between the ribs 17 and 18 for transferring of part of the load acting on the rib 18 to the center rib 17.

At the other end of the sleeve 11 the rib 15, although relatively short, will still deflect somewhat under high axial loads to transfer a portion of the forces acting on that end of the sleeve 11 to the adjacent rib 16 through stretching of the tube 13 between the ribs 15 and 16. These forces acting on the rib 16 are substantially less than those carried by the rib 15, and accordingly the rib 16 is made longer than rib 15 so that it too will deflect to allow stretching of the tube 13 between the ribs 16 and 17 and transferring of part of its load to the center rib 17.

From the above discussion, it can now be seen that the axial pull-out forces acting on the tube 13 are distributed over all of the ribs 15–19, thus eliminating high stress concentrations at the end ribs 15 and 19. However, because of the progressive lengthening of the ribs 15–19 toward the outer end of the sleeve, the largest portion of the shear stresses is carried by the rib 15 and there is a progressive reduction in such shear stresses toward the outer end of the sleeve 11 carried by the ribs 16, 17, 18 and 19. This makes it possible to progressively reduce the cross-sectional area of the sleeve 11 toward its outer end in accordance with the decreasing load thereon without subjecting one portion of the sleeve length to a greater unit stress than any other portion. As clearly shown in FIG. 2, such progressive reduction in the cross-sectional area of the sleeve 11 is accomplished by making the recesses 21–26 progressively deeper toward the outer end of the sleeve. Such a sleeve 11 is substantially lighter than one in which all of the recesses are the same depth, which is an essential factor in aircraft and space vericle components.

Although three intermediate ribs 16–18 are shown, it should be understood that a greater or lesser number of such intermediate ribs may be provided if desired.

Other modes of applying the principles of the invention may be employed, change being made as regards the details described, provided the features stated in any of the following claims or the equivalent of such be employed.

I therefore, particularly point out and distinctly claim as my invention:

1. A tube coupling comprising a metal coupling member and a metal tube, the end portion of the tube being telescoped over and deformed into recesses in a portion of said metal coupling member, said tubular end portion being of a softer material than said coupling member and having a lower yield stress, said tubular end portion in its deformed condition being compressed beyond its yield stress into contact with said coupling member portion and said coupling member portion in its deformed condition being substantially compressed by the deformation of said tubular end portion, said portions upon release of the deforming pressure being maintained in tight contact with each other due to the offsetting residual tensile and compressive hoop stresses in said tubular end portion and coupling member portion, respectively, the outer surface of said coupling member portion having a plurality of axially spaced annular recesses formed therein which define a plurality of relatively narrow annular rib means embedded in said tubular end portion to provide a high pressure fluid joint and a strong mechanical connection therebetween, the depths of said recesses progressively increasing toward the entry end of said coupling member portion to provide progressively longer rib means whose outer diameters are initially slightly less than the inner diameter of said tubular end portion prior to such deformation for establishing a close fit therebetween during telescoping of said tubular end portion over said coupling member portion as aforesaid, said rib means under the application of an axial pullout force acting on said portions being yieldable in varying amounts in accordance with the force acting thereon and their lengths to substantially uniformly distribute such forces among all of said rib means.

2. The coupling of claim 1 wherein there are three intermediate rib means whose lengths progressively increase in the direction of such entry end.

3. The coupling of claim 1 wherein said coupling member portion has a reduced outside diameter portion adjacent such entry end, such entry end being rounded to merge tangentially with such reduced diameter portion for ease of assembly of said tubular end portion over said coupling member portion.

4. The coupling of claim 1 wherein the cross-sectional area of said coupling member portion between said rib means progressively decreases toward such entry end in accordance with the distribution of forces acting thereon at a substantial savings in weight without subjecting any part of said coupling member portion to a substantially higher unit stress.

5. The coupling of claim 1 wherein said rib means are of relatively narrow width at their outside diameters and the sides of said rib means taper outwardly away from their outside diameters.

References Cited

UNITED STATES PATENTS

| 1,911,775 | 5/1933 | Smith | 285—382.2 |
| 2,092,358 | 9/1937 | Robertson | 285—382.4 |
| 3,149,860 | 9/1964 | Hallesy | 285—382 |
| 3,188,733 | 6/1965 | Rickard | 285—382.4 |

FOREIGN PATENTS

| 766,741 | 1/1957 | Great Britain. |

CARL W. TOMLIN, *Primary Examiner.*

WAYNE L. SHEDD, *Assistant Examiner.*

U.S. Cl. X.R.

29—516